United States Patent [19]

Lupke

[11] Patent Number: 4,712,993
[45] Date of Patent: Dec. 15, 1987

[54] EXTRUSION DIE FOR EXTERNALLY RIBBED PLASTIC TUBING

[76] Inventor: Manfred A. A. Lupke, 92 Elgin St., Thornhill, Ontario, Canada, L3T 1W6

[21] Appl. No.: 843,516

[22] Filed: Mar. 25, 1986

[51] Int. Cl.$^4$ .............................................. B29C 47/22
[52] U.S. Cl. ................................ 425/466; 425/326.1; 425/DIG. 13; 425/378 R
[58] Field of Search ............ 425/461, 465, 466, 326.1, 425/378 R, DIG. 13, 325, 327, 376 R, 371, 532, 539, 388, 392, 395, 396

[56] References Cited

U.S. PATENT DOCUMENTS

| | | | |
|---|---|---|---|
| 2,859,476 | 11/1958 | Lainson | 425/466 |
| 2,972,780 | 2/1961 | Buonstra | 264/26 |
| 3,305,893 | 2/1967 | Machen | 425/378 |
| 3,327,038 | 6/1967 | Fox | 425/466 |
| 3,677,676 | 7/1972 | Hegler | 425/380 |
| 3,994,646 | 11/1976 | Hauck | 425/326.1 |
| 3,996,323 | 12/1976 | Hegler et al. | 425/326.1 |
| 4,199,314 | 4/1980 | Lupke et al. | 425/326.1 |
| 4,226,580 | 10/1980 | Lupke et al. | 425/326.1 |
| 4,305,703 | 12/1981 | Lupke et al. | 425/380 |
| 4,500,284 | 2/1985 | Lupke | 425/326.1 |

Primary Examiner—Willard E. Hoag

[57] ABSTRACT

An extrusion die for externally ribbed seamless plastic tubing, including an extrusion head with an elongate nozzle within which a hollow mandrel is placed. The nozzle and mandrel define an annular extrusion orifice forming a parison of the tubing and having a coaxial conical portion with its generatrix forming an angle of substantially more than 45″ with the longitudinal axis of the head, the diameter of the mandrel at its delivery end being not less than that of the nozzle. The die can be supplied also with an electrical heater incorporated inside the mandrel after said orifice, with a centering means mounting said nozzle uniformly spaced around the mandrel, with a threaded member for adjusting longitudinally said mandrel to vary the size of the extrusion orifice, and with a coupling means interconnecting said mandrel and the head and allowing only the axial, without rotation, movement of the mandrel.

4 Claims, 1 Drawing Figure

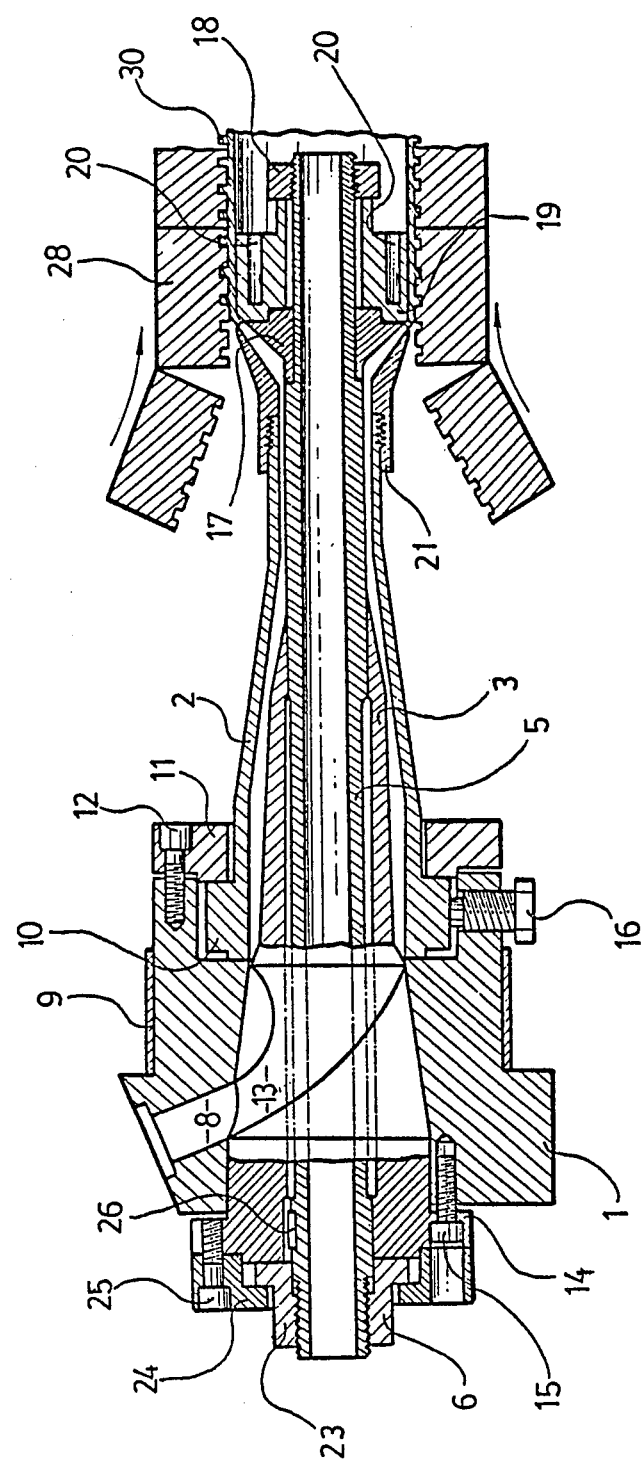

EXTRUSION DIE FOR EXTERNALLY RIBBED PLASTIC TUBING

BACKGROUND OF THE INVENTION

This invention relates to extrusion dies for an apparatus producing seamless plastic tubing, particularly, pipes with a smooth inner surface and an annularly ribbed or finned outer surface defined by alternating ribs and grooves.

Known dies of such a type (for example, U.S. Pat. Nos. 3,891,007, 3,998,579 and 4,365,948) include an extrusion head with a nozzle within which a hollow mandrel is placed and defining an annular extrusion orifice forming a parison of the tubing.

The major drawback of these dies is that their mandrel extends substantially beyond the nozzle and forms a large cavity wherein the material is cooled, less viscous materials (such as polivinyl chloride) being therefore not employable. Also, the known dies do not allow to vary the wall thickness of the tubing.

SUMMARY OF THE INVENTION

The objectives of the present invention is to provide a simple structure overcoming the above drawbacks and allowing to employ less viscous plastic materials and to vary the wall thickness of the produced tubing.

This is achieved by the following means:
- the delivery end of the nozzle and mandrel has a coaxial conical portion with its generatrix forming an angle of substantially more than 45" with the longitudinal axis of the head, the diameter of the mandrel at said end being not less than that of the nozzle,
- a threaded adjusting member is included for adjusting longitudinally said mandrel, effective to vary the size of the extrusion orifice when the mandrel is axially adjusted.

In addition, the present die allows easy replacement of the nozzles and mandrels for cleaning and for different sizes of the produced tubing.

A more complete appreciation of the present invention and the distinguishing characteristics, objectives and attendant advantages thereof set out herein are more apparent and obvious to one ordinary skilled in the art from the following detailed description, drawings and appended claims.

BRIEF DESCRIPTION OF THE DRAWING

A lone FIGURE is a longitudinal section of the present die for an apparatus producing plastic pipes with a smooth interior and an annularly ribbed exterior.

DESCRIPTION OF THE PREFERRED EMBODIMENT

Referring now to the drawings, the extrusion die of the present invention for an apparatus producing externally ribbed plastic tubing includes an extrusion head 1, an elongate nozzle 2, a hollow mandrel 3, a centering means, an elongate hollow carrier 5, a threaded adjusting member 6 and a coupling means.

The extrusion head 1 has a central bore with a lateral opening 8 for fluid communication with an extruder (not shown) and for receiving an extrudate of a thermoplastic material under pressure therefrom. The head 1 is provided with a heater 9 and thermal sensors (not shown).

The nozzle 2 has a flange 10 in its receiving end for clamping the nozzle to the head 1. This is achieved by means of a ring 11 with screws 12 disposed circumferentially around the flange 10. The nozzle 2 provides a supply passage extending in the longitudinal direction of the nozzle and adapted for the delivery of the extrudate to an extrusion orifice forming the pipe.

The mandrel 3 is placed in said central bore in substantially coaxial relation with the nozzle 2 and is spaced from the latter. The lateral surface of the mandrel has curved slots 13 to which the opening 8 is tangential to provide a gradual transition to a plastic conducting passage extending in the longitudinal direction of the die for the delivery of the extrudate to the extrusion orifice. A free end of the mandrel 3 has a flange 14 which is fastened to the head 1 with screws 15 circumferentially spaced around the mandrel.

The centering means mounts the nozzle 2 uniformly spaced around the mandrel 3 and has centering screws 16 disposed radially in the head 1. The screws 16 interact with the lateral surface of the flange 10 of the nozzle 2. This permits the radial adjustment of the same with respect to the mandrel 3.

The carrier 5 is placed within the first mandrel 3 and carries a cone 17 which is fixed to the carrier by means of a nut 18 and a bullet 19 incorporating electrical heaters 20 with thermal sensors (not shown).

The free end of the nozzle 2 is screwed into a caliper 21 defining together with the cone 17 an annular extrusion orifice of diminishing interior dimensions through which the extrudate can flow uninterruptedly and form a parison of the produced tubing within the caliper 21 and around the cone 17. The orifice has a coaxial conical portion with its generatrix forming an angle of substantially more than 45" with the longitudinal axis of the head.

The threaded member 6 is represented by a nut and adjusts the carrier 5 longitudinally, which is effective to vary the size of the extrusion orifice when the carrier is axially displaced by rotating the nut on the free threaded end of the carrier 5. The nut is held in place by means of its flange 23 and a cap 24 fixed to the flange 14 with circumferentially disposed screws 25. Such a structure allows the rotation of the nut without its axial displacement.

The coupling means is represented by a key 26, interconnects the carrier 5 and the mandrel 3 and allows only the axial, without rotation, movement of the carrier 5.

As already mentioned, the particular embodiment of this invention is adapted for the production of externally ribbed tubing, for which a tubular mold cavity is formed by a series of forwardly moving molds 28 described, for example, in my U.S. Pat. No. 4,510,013 (the mentioned patents employ similar molds).

In operation, an extrudate of an expandable plastic material flows from the extruder uninterruptedly through the passage between the nozzle 2 and the mandrel 3 to the extrusion orifice to form the externally ribbed tubing 30 conforming to the wall of the tubular mold cavity.

While there has been described and pointed out the fundamental novel feature of the invention as applied to the preferred embodiment, it is to be understood that this description is exemplary and explanatory, but not restrictive, the invention being not limited to the specific details shown and described. Various departures, omissions, substitutions and changes may be made by the skilled in the art without departing from the scope of the invention and without sacrificing its chief advantages. Obviously, many modifications and variations of the present invention are possible in light of the above teaching. It is therefore to be understood that within the scope of the appended claims, the present invention may be practiced otherwise than as specifically described herein.

What is claimed is:

1. An extrusion die for an apparatus producing seamless plastic tubing having a smooth inner surface and an annularly ribbed outer surface defined by alternating ribs and grooves, including:
    an extrusion head having a central bore with a lateral opening for receiving an extrudate of a thermoplastic material under pressure therefrom,
    an elongate nozzle attached to said head and providing a supply passage extending in the longitudinal direction thereof for the delivery of said extrudate to the delivery end thereof,
    a hollow mandrel placed in said bore in substantially coaxial relation with said nozzle and spaced from the latter to provide a plastic conducting passage extending in the longitudinal direction thereof for the delivery of said extrudate to the delivery end thereof, the nozzle and mandrel defining respectively the annular extrusion orifice of diminishing interior dimensions, through which the extrudate can flow uninterruptedly and form a parison within the nozzle and around the mandrel, said delivery end of the mandrel having a coaxial external conical portion;
    a threaded adjusting member for adjusting longitudinally said mandrel, effective to vary the size of the extrusion orifice when the mandrel is axially adjusted;
    a coupling means interconnecting said mandrel and the head and allowing only the axial, without rotation, movement of the mandrel.

2. The die of claim 1 wherein said coupling means is represented by a key.

3. The die of claim 1 wherein said coupling means is represented by a spline.

4. An extrusion die for an apparatus producing seamless plastic tubing having a smooth inner surface and an annularly ribbed outer surface defined by alternating ribs and grooves, including:
    an extrusion head having a central bore with an opening for receiving an extrudate of a thermoplastic material under pressure therefrom;
    an elongate nozzle attached to said head and providing a supply passage extending in the longitudinal direction thereof for the delivery of said extrudate to the delivery end thereof;
    a hollow mandrel placed in said bore in substantially coaxial relation with said nozzle and spaced from the latter to provide a plastic conducting passage extending in the longitudinal direction thereof for the delivery of said extrudate to the delivery end thereof, the nozzle and mandrel defining respectively the annular extrusion orifice of diminishing interior dimensions, through which the extrudate can flow uninterruptedly and form a parison within the nozzle and around the mandrel;
    an electrical heater incorporated inside said delivery end of the mandrel.

* * * * *